United States Patent
Yasuda

(10) Patent No.: US 9,965,839 B2
(45) Date of Patent: May 8, 2018

(54) APPARATUS FOR QUALITY INSPECTION OF SHAFTS

(71) Applicant: YUTAKA Co., Ltd., Osaka (JP)

(72) Inventor: Nobuyuki Yasuda, Osaka (JP)

(73) Assignee: Yutaka Co., Ltd., Osaka (JP)

( * ) Notice: Subject to any disclaimer, the term of this patent is extended or adjusted under 35 U.S.C. 154(b) by 386 days.

(21) Appl. No.: 14/784,297

(22) PCT Filed: Mar. 27, 2014

(86) PCT No.: PCT/JP2014/058792
§ 371 (c)(1),
(2) Date: Oct. 14, 2015

(87) PCT Pub. No.: WO2014/171285
PCT Pub. Date: Oct. 23, 2014

(65) Prior Publication Data
US 2016/0063693 A1    Mar. 3, 2016

(30) Foreign Application Priority Data

Apr. 18, 2013  (JP) .................................. 2013-087289
Jun. 28, 2013  (WO) .................. PCT/JP2013/067793

(51) Int. Cl.
H04N 7/18    (2006.01)
G06T 7/00    (2017.01)
(Continued)

(52) U.S. Cl.
CPC .......... *G06T 7/0004* (2013.01); *B65G 47/846* (2013.01); *G01B 11/24* (2013.01); *H04N 7/183* (2013.01); *G06T 2207/30164* (2013.01)

(58) Field of Classification Search
CPC .......... B26D 1/143; B23Q 1/76; B23Q 7/003; B23Q 7/042; B23Q 11/0046;
(Continued)

(56) References Cited

U.S. PATENT DOCUMENTS

2004/0223143 A1    11/2004    Yasuda et al.

FOREIGN PATENT DOCUMENTS

JP    61-211220    9/1986
JP    62-74623    5/1987
(Continued)

OTHER PUBLICATIONS

Notification of Reasons for Refusal dated Sep. 5, 2017 in Japanese Patent Application No. 2015-512383, with English-language translation.
(Continued)

*Primary Examiner* — Sath V Perungavoor
*Assistant Examiner* — Peet Dhillon
(74) *Attorney, Agent, or Firm* — Wenderoth, Lind & Ponack, L.L.P.

(57) ABSTRACT

An apparatus for quality inspection of shafts includes a rotary table having cutout grooves at the outer periphery thereof. The rotary table includes an upper disk and a lower disk stacked in the vertical direction so as to be rotatable relative to each other; and plate members provided on the upper surface of the lower disk and inserted in respective first cutouts formed at the outer periphery of the upper disk. One of groove edges of each cutout groove is constituted by one side edge of each first cutout, and the other groove edge is constituted by one side edge of each plate member. Second cutout, corresponding to the first cutout and provided in the lower disk, are grooves including side edges, and an end edge perpendicular to the side edges. The distance between these side edges is larger than the maximum groove width of the cutout grooves.

16 Claims, 9 Drawing Sheets

(51) Int. Cl.
*B65G 47/84* (2006.01)
*G01B 11/24* (2006.01)

(58) Field of Classification Search
CPC .... F16H 2049/003; F16H 49/001; F16H 7/06; F16H 25/08
See application file for complete search history.

(56) References Cited

FOREIGN PATENT DOCUMENTS

| | | |
|---|---|---|
| JP | 11-349137 | 12/1999 |
| JP | 2004-354367 | 12/2004 |
| JP | 2006-071303 | 3/2006 |
| JP | 2009180505 A * | 8/2009 |
| JP | 2010-008283 | 1/2010 |
| JP | 2010-142770 | 7/2010 |

OTHER PUBLICATIONS

International Search Report dated May 20, 2014 in International (PCT) Application No. PCT/JP2014/058792.

* cited by examiner

APPARATUS FOR QUALITY INSPECTION OF SHAFTS

TECHNICAL FIELD

The present invention relates to an apparatus for quality inspection of shafts used to carry out the quality inspection of headed shafts, such as screws, nails, bolts, and rivets. More specifically, the present invention relates to an apparatus for quality inspection of shafts in which conveyance of shafts varying in shaft diameter can be carried out with one rotary table.

BACKGROUND ART

As a conventional apparatus for quality inspection of shafts used to carry out the quality inspection of shafts, one disclosed in the below-identified Patent Document 1 is, for example, known.

The inspection apparatus disclosed in Patent Document 1 includes a rotary table provided with cutout grooves at the outer periphery thereof at a predetermined pitch, and configured to rotate about a spindle provided in the center of the rotary table, and works (i.e., headed shafts to be inspected) supplied from a work feeder is introduced to into the respective cutout grooves.

The neck portions of the works are inserted into the cutout grooves provided at the outer periphery of the rotary table such that the works are suspended by the rotary table with their heads placed on the upper surface of the rotary table.

A fixing guide is installed downstream of the installation point of the work feeder (forward in the direction in which the shafts are conveyed) along the outer periphery of the rotary table.

The fixing guide prevents the works introduced from the work feeder into the cutout grooves from slipping away therefrom. The works held by the cutout grooves in this state are conveyed as the rotary table rotates, and the quality inspection of the shaft portion and head portion of each of the works is carried out when each of the works passes by an inspection unit disposed at an intermediate portion of a conveyance path which is formed by the rotation of the rotary table.

PRIOR ART DOCUMENTS

Patent Documents

Patent Document 1 JP 2010-142770 A

SUMMARY OF THE INVENTION

Problems to be Solved by the Invention

In the rotary table for conveyance of shafts, included in the apparatus for inspection of headed shafts, the cutout grooves provided at the outer periphery of the rotary table are formed to have a size matching to the shaft diameter of the shafts to be inspected.

If the shafts suspended by the rotary table are moved or tilted during the conveyance, the accuracy of the inspection is reduced. Therefore, it is important that the shafts be supported by the rotary table by being suspended therefrom in a stabled manner, and in order to meet this requirement, the cutout grooves need to have a size matching the shaft diameter of the shafts to be conveyed.

However, the shafts to be inspected come in various types and shapes, and thus the shaft diameter of the shafts to be inspected naturally varies. In order to carry out the inspection of shafts varying in shaft diameter with the same inspection apparatus, conventionally, the inspection has been carried out by preparing a plurality of rotary tables provided with cutout grooves of different sizes, and by exchanging the rotary tables so that the size of the cutout grooves matches the shaft diameter of the shafts to be inspected.

In the above mentioned manner, however, a large number of rotary tables need to be prepared, and it is not economically efficient. In addition, since the exchange of rotary tables requires time, the operation efficiency of the inspection apparatus is also compromised.

Since a camera and the like included in the inspection apparatus could be obstacles when the exchange of rotary tables is carried out, the camera and the like need to be removed before exchanging the rotary tables. Therefore, in fact, even an expert actually spends about 40 to 90 minutes in the exchange of the rotary tables.

Accordingly, an object of the present invention is to provide an inspection apparatus which does not require the exchange of the rotary tables, in other words, to provide an inspection apparatus in which several types of shafts varying in shaft diameter can be stably conveyed with one rotary table, and in which the entire region of the shafts can be inspected.

Means for Solving the Problems

In order to solve the above mentioned problems, the present invention presupposes:
an apparatus for quality inspection of shafts, comprising:
a rotary table (2) provided with cutout grooves (5) disposed at the outer periphery thereof at a predetermined pitch, and configured to receive the neck portions of headed shafts (A) supplied from a work feeder (12) in each of the cutout grooves (5), and to convey the headed shafts (A) suspended by the rotary table (2); and
an inspection station disposed at an intermediate portion of a conveyance path to be formed by the rotation of the rotary table;
wherein the inspection station includes a camera configured to capture the images of the headed shafts being conveyed, from radially outward of the rotary table;
and has adopted the following constitution in order to provide an improved inspection apparatus.

Specifically, in the apparatus for quality inspection of shafts according to the present invention, the rotary table includes: an upper disk and a lower disk stacked in a vertical direction so as to be rotatable relative to each other; and plate members provided in the same number as the cutout grooves, each having the same thickness as the upper disk.

In the present inspection apparatus, first cutouts each defining each of the cutout grooves are provided at the outer periphery of the upper disk, and second cutouts each corresponding to each of the first cutouts are provided at the outer periphery of the lower disk; and each of the plate members is inserted in each of the first cutouts provided at the outer periphery of the upper disk, and fixed to the upper surface of the lower disk.

Further, in the present inspection apparatus, each cutout groove has a first groove edge and a second groove edge facing, respectively, forward and rearward in the direction in which the table rotates, with the first groove edge defined by one of the side edges of each of the first cutouts; and the second groove edge defined by one of the side edges of each plate member.

In addition, each of the second cutouts is formed as an angular groove including side edges which are parallel to each other and located forward and rearward in the direction in which the table rotates, and an end edge perpendicular to the side edges; wherein the distance between the side edges is set to be larger than the maximum groove width of each of the cutout grooves, whose width can be adjusted.

The inspection apparatus according to the present invention is configured such that the neck portions of the shafts to be conveyed (shafts to be inspected) is introduced into the cutout grooves provided at the outer periphery of the rotary table, and the head portions of the shafts (in the case of the shafts having a head with a flange integral with the head, the flange is considered to be a part of the head) are supported by both the upper disk and the respective plate members, such that the shafts are suspended by the rotary table. The rotary table is rotated together with the spindle in this state, and the suspended shafts are allowed to be carried through the conveyance path.

In the present inspection apparatus, it is preferred that the surfaces of the side edges and the end edge of each second cutouts be mirror finished. Further, it is preferred that groove bottoms of the cutout grooves are designed to form a V-groove. Still further, it is preferred that each cutout groove is provided with a slit extending radially inward from between the groove bottoms, between the upper disk and each of the plate members.

In addition, it is also preferred that the present inspection apparatus include an operating portion for allowing the relative rotation between the upper disk and the lower disk.

Effect of the Invention

The apparatus for quality inspection of shafts according to the present invention is configured such that two disks (upper and lower disks) are combined to form the rotary table, and when the two disks are rotated relative to each other, the width of the cutout grooves provided at the outer periphery of the rotary table changes.

Therefore, the width of the cutout grooves can be adjusted to match the size of the shafts to be inspected, and it is possible to carry out the conveyance of various types of shafts varying in shaft diameter with one rotary table.

Further, in the apparatus according to the present invention, the shafts can be supported without being tilted, because the plate members having the same thickness as the upper disk are attached on the upper surface of the lower disk, so that the heights of the surfaces which support the heads of the shafts, which surfaces are constituted by the plate members and the upper disk, are the same. In addition, since the heights of the groove edges of each of the cutout grooves facing, respectively, forward and rearward in the direction in which the table rotates are the same, the shaking of the shafts can be prevented by the groove edges in a balanced manner, thereby securing the stable conveyance of the shafts. In this embodiment, the plate members may be integrally provided with the lower disk.

In addition, by forming each of the second cutouts provided in the lower disk to include groove edges which are parallel to each other and located forward and rearward in the direction in which the table rotates, and to have a groove width larger than the maximum width of each of the cutout grooves, it is possible to enhance the clarity of the images (the images of the neck portions of the shafts, in particular) captured by a CCD camera included in the inspection unit, and the accuracy and the reliability of the inspection can be improved.

In the present apparatus in which the pair of the groove bottoms of each of the cutout grooves is designed to form a V-groove, the position of each of the shafts can be stably fixed utilizing the centripetal action provided by the V-groove.

Further, in the present apparatus in which each of the cutout grooves is provided with a slit extending radially inward from between the pair of the groove bottoms of each of the cutout grooves, it is possible to capture a clearer image of the neck portion of each of the shafts inserted into each the cutout grooves by the camera, and to detect the problems of the shafts by a sensor.

Still further, in the present apparatus including an operating portion for allowing the relative rotation between the upper disk and the lower disk, the upper disk and the lower disk can be easily rotated relative to each other.

MODE FOR CARRYING OUT THE INVENTION

An apparatus for quality inspection of shafts embodying the present invention will now be described with reference to FIG. 1 to FIG. 10.

Figure 1:
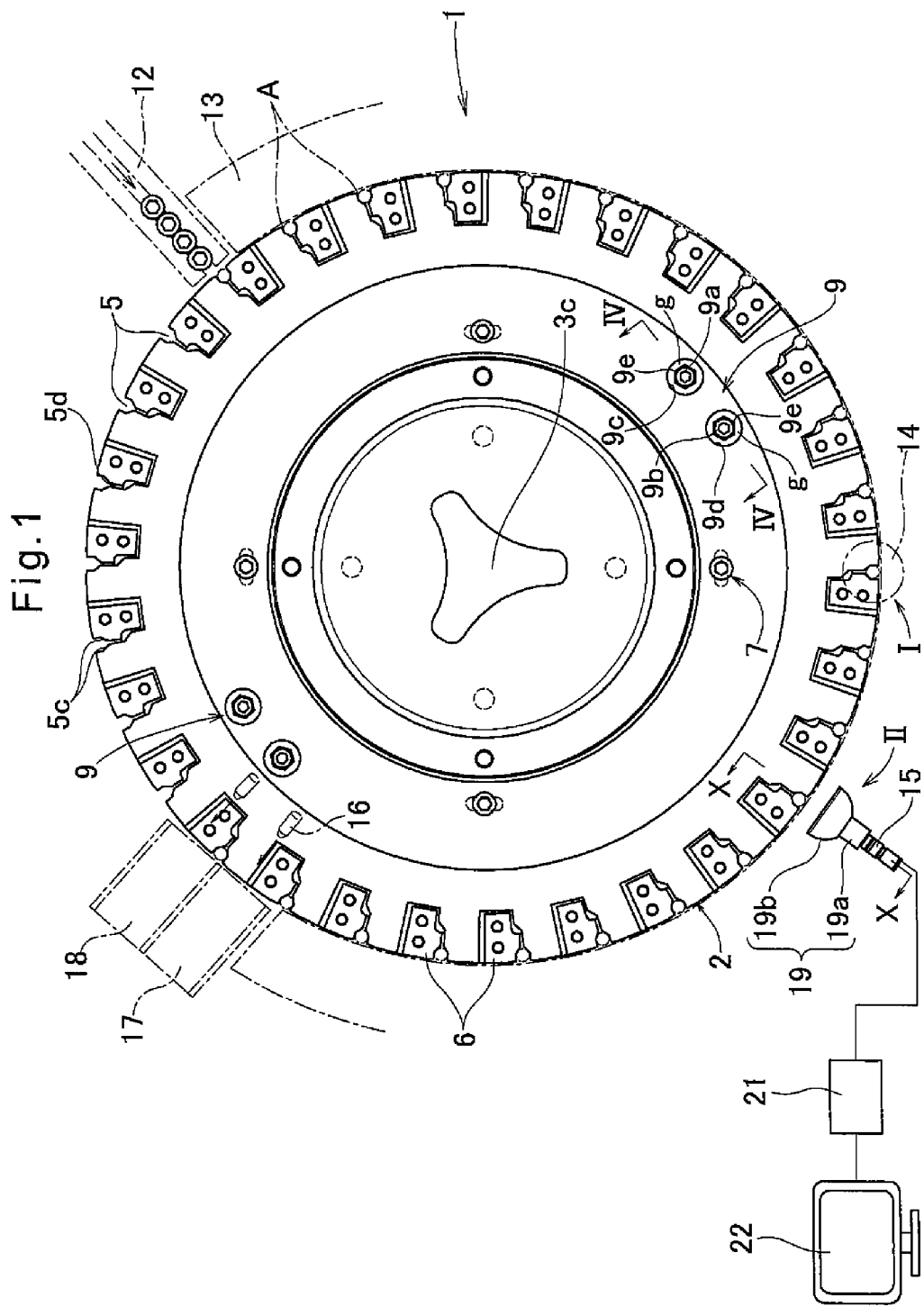
FIG. 1 is a schematic plan view of an apparatus for quality inspection of shafts according to the present invention.
Figure 2:
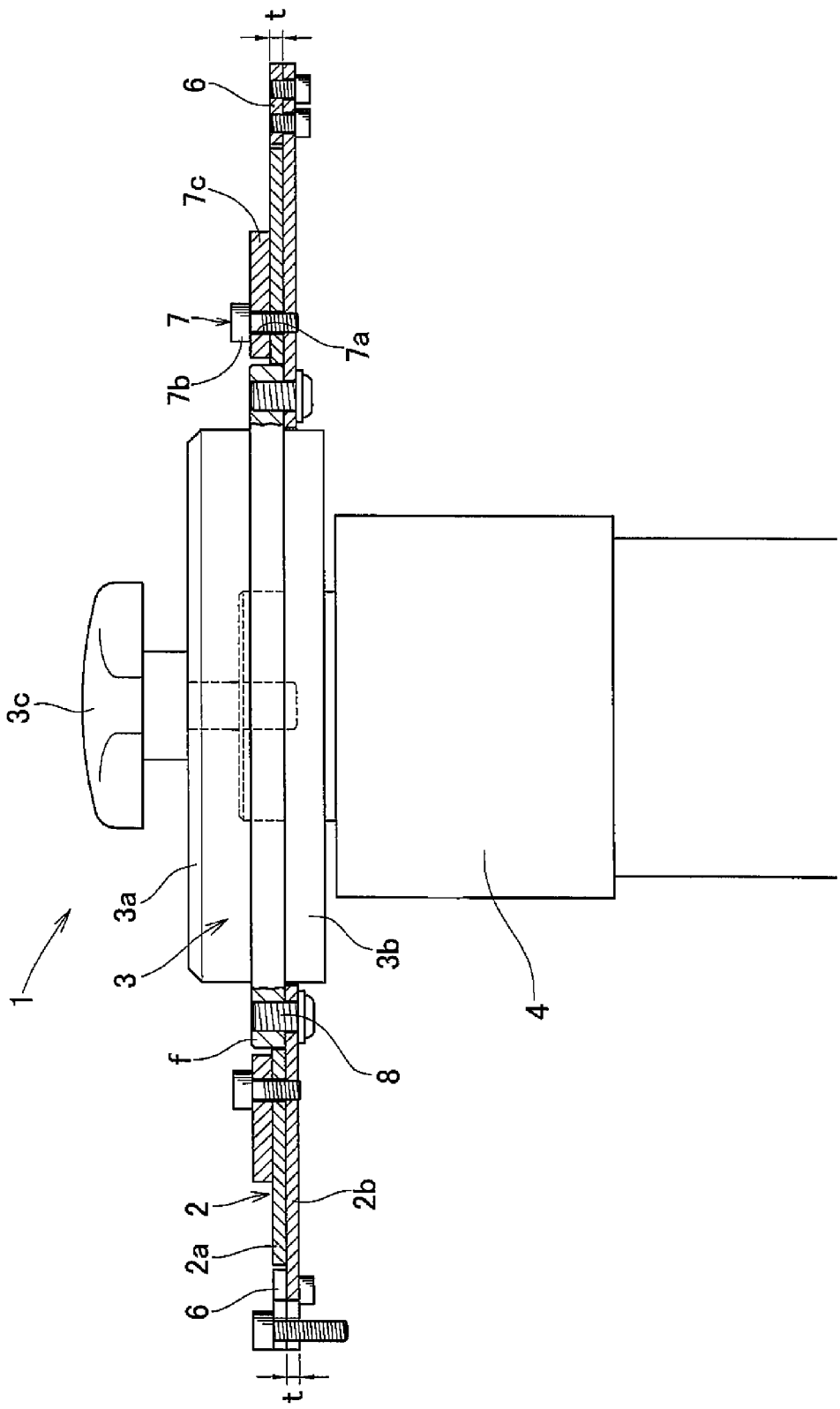
FIG. 2 is a side view of the apparatus for quality inspection of shafts shown in FIG. 1, showing a section of an upper disk and a lower disk of a rotary table included in the apparatus.

As shown in FIG. 1 and FIG. 2, the apparatus 1 for quality inspection of shafts according to the present invention includes a rotary table 2, and a rotation driving source 4 configured to rotate the rotary table 2 together with a spindle 3 disposed at the center of the rotary table 2.

The apparatus 1 further includes: a work feeder 12 (one shown in the figures is a linear feeder) for supplying headed shafts; a fixed guide 13 disposed forward of the installation point of the work feeder 12 in the direction in which the headed shafts are conveyed, along the outer periphery of the rotary table 2, and configured to prevent the shafts from falling out of cutout grooves; and inspection stations I and II provided at intermediate positions in a conveyance path to be formed by the rotation of the rotary table.

In the inspection station I, a camera 14 is provided which is configured to capture the images of the headed shafts being conveyed, from above.

Figure 10:
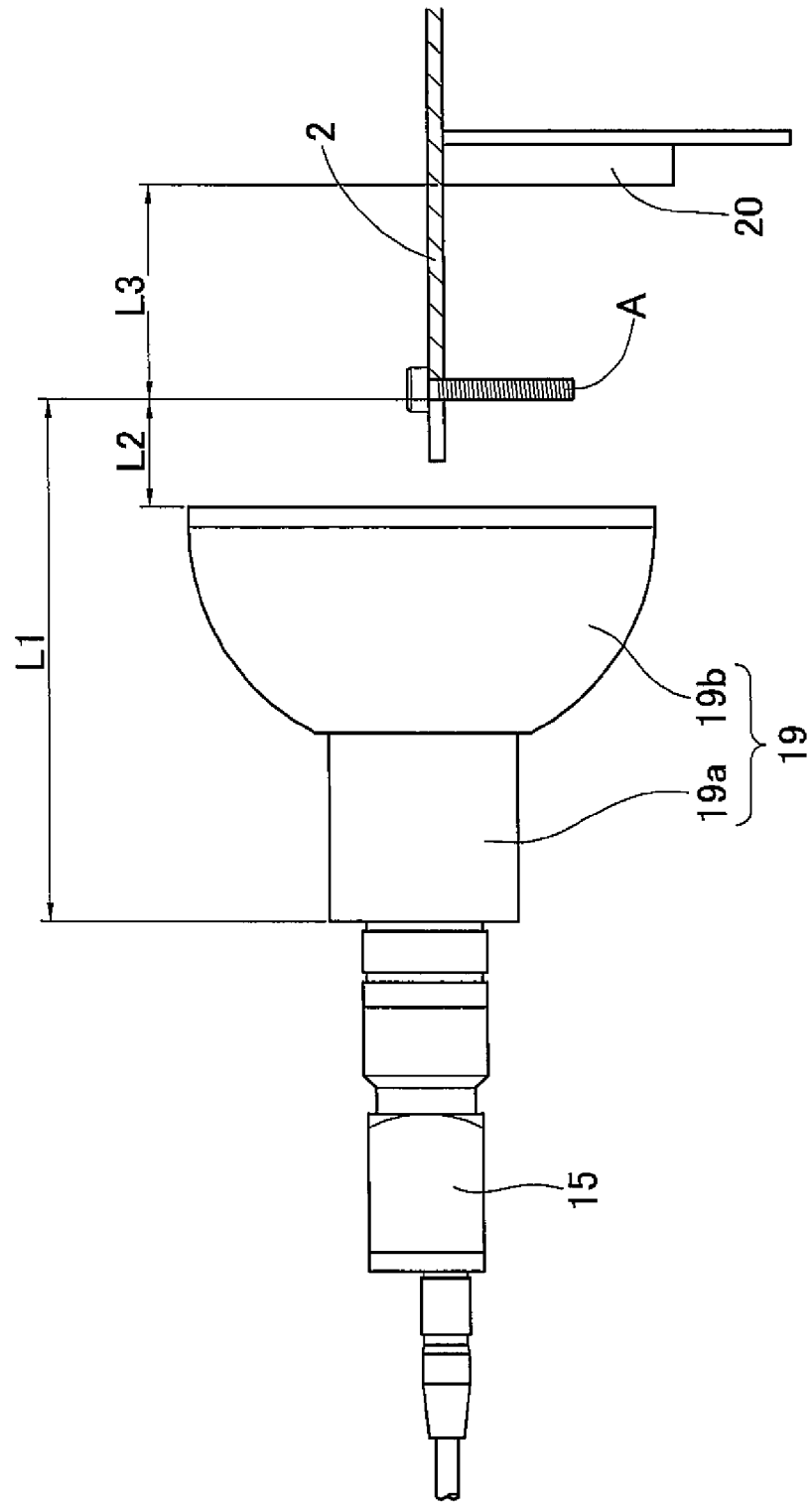
FIG. 10 is a sectional view of the apparatus for quality inspection of shafts shown in FIG. 1, taken along the line X-X.

In the inspection station II, there are provided a camera 15 configured to capture the images of the headed shafts being conveyed, from one side of the shafts; a lighting equipment 19 (see FIG. 10) disposed on the same side of the shafts as the camera 15; and a back light 20 (see FIG. 10). The camera 15 is a commercially available CCD camera in the embodiment, but not limited to a CCD camera. Further, the camera 15 can be of any manufacturer, and it may be a color camera or a black and white camera.

Although the inspection apparatus shown has two inspection stations, the present invention is also applicable to an inspection apparatus without the inspection station I, or an inspection apparatus having three or more inspection stations.

Figure 3:
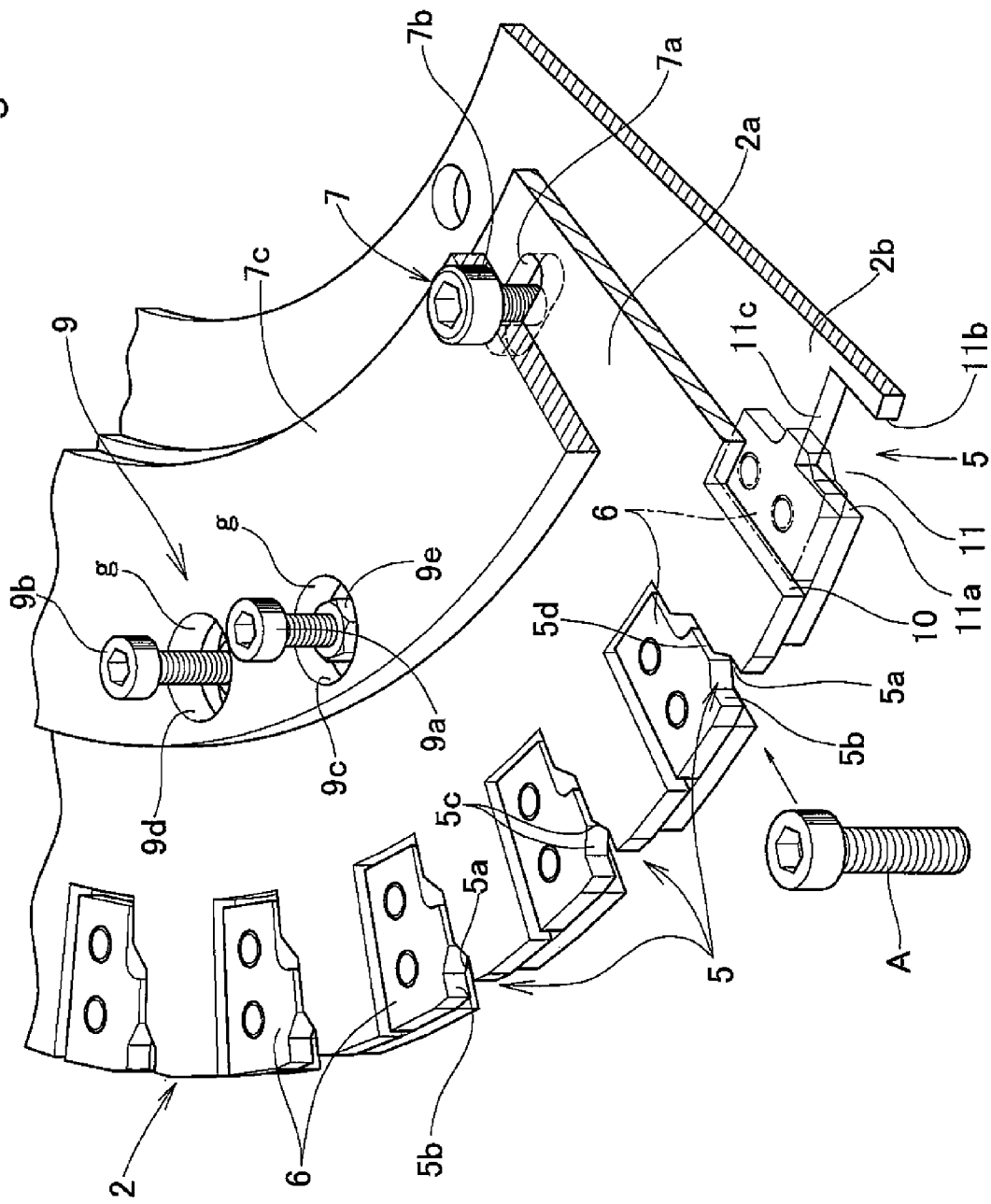
FIG. 3 is a partial perspective view of the rotary table included in the apparatus for quality inspection of shafts shown in FIG. 1.

As shown in FIG. 1 and FIG. 3, the rotary table 2 is provided with cutout grooves 5 at the outer periphery thereof at a predetermined pitch in the circumferential direction. The rotary table 2 comprises a ring-shaped lower disk 2b on the upper surface of which plate members 6 are attached; and a ring-shaped upper disk 2a stacked on top of the lower disk 2b. The rotary table 2 further includes a lock mechanism 7 configured to fix the upper disk 2a and the lower disk 2b relative to each other at a desired relative rotational position between the disks 2a and 2b; and an operating arrangement 9 for rotating the upper disk 2a and the lower disk 2b relative to each other.

The spindle 3 includes a disk mounting portion 3a (see FIG. 1) provided with a flange f at the outer periphery thereof. The disk mounting portion 3a is attached onto, while being aligned with, a rotating portion 3b configured to be rotationally driven by the rotation driving source 4, and fixed to the rotating portion 3b by tightening a bolt 3c with a knob.

The upper disk 2a and the lower disk 2b are fastened to each other by the lock mechanism 7, and the lower disk 2b is detachably fixed to the flange f provided at the outer periphery of the disk mounting portion 3a with fasteners 8. Although the figures show an example in which bolts are used as the fasteners 8, the fasteners 8 are not limited thereto. The rotation driving source 4 is a motor whose rotational speed can be controlled.

The upper disk 2a and the lower disk 2b of the rotary table 2 are stacked one on top of the other so as to be capable of being rotated relative to each other about the spindle 3.

The plate thicknesses t of the upper disk 2a and the lower disk 2b (see FIG. 2) are not particularly limited, but it is preferred that both disks are as thin as possible. For example, when the rotary table 2a had an outer diameter of from 200 mm to 400 mm, and each disk had a plate thickness of 3 mm, the rotary table was free of distortion. The thinner the thickness of the upper disk 2b is, the wider the variation of the shafts to be inspected.

The plate members 6 are provided in the same number and at the same pitch as the cutout grooves 5. First cutouts 10 are provided at the outer periphery of the upper disk 2a at the same pitch as the cutout grooves 5, and each of the plate members 6, which are fixed on the upper surface of the lower disk 2b along the outer periphery thereof, is inserted in each of the first cutouts 10.

In the inspection apparatus shown, the plate members 6 are separate members from the lower disk 2b, and attached on the upper surface of the lower disk 2b along the outer periphery thereof. However, the plate members 6 may be formed integrally with the lower disk 2b.

Second cutouts 11 corresponding to the respective first cutouts 10 of the upper disk 2a are provided at the outer periphery of the lower disk 2b, in the same number and at the same pitch as the cutout grooves 5.

Each of the second cutouts 11 has side edges 11a and 11b which are parallel to each other and located forward and rearward in the direction in which the rotary table 2 rotates. The side edges 11a and 11b have radially inner ends which are connected together through an end edge 11c perpendicular to the side edges, and arranged such that the distance therebetween is larger than the maximum groove width of the corresponding cutout groove 5, whose width can be adjusted.

The surfaces of side edges 11a, 11b and the end edge 11c of the second cutouts 11 are preferably mirror finished, because it was found out that their images captured by the CCD camera 15 were clearer when these edges were mirror-finished.

The CCD camera 15 is arranged so as to face the center of the rotary table 2 from the radially outer side thereof, to capture the image of each of headed shafts A being conveyed, from the side.

The lighting equipment 19 shown is a combination of a coaxial illumination 19a disposed on the same axis as the CCD camera 15 and a dome illumination 19b.

As shown in FIG. 10, the back light 20 is disposed so as to face the CCD camera 15 with the conveyance path therebetween.

Each cutout groove 5 has a groove edge 5a and a second groove edge 5b facing, respectively, forward and rearward in the rotational direction of the table, and defined, respectively, by one of the side edges of the corresponding first cutout 10 located rearward of the first cutout 10 in the rotational direction of the table, and by one of the side edges of the corresponding plate member 6 located rearward of the plate member 6 in the rotational direction of the table.

Figure 5:
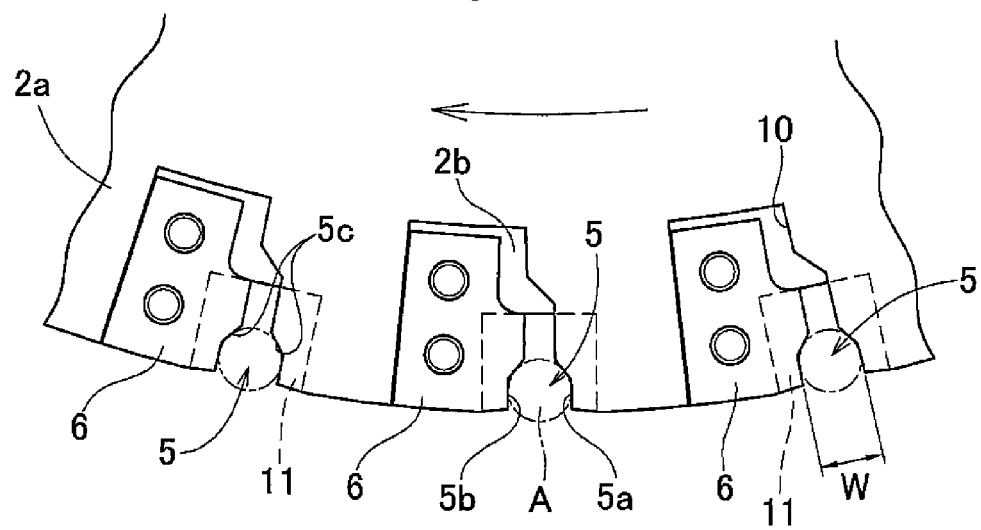
FIG. 5 is a top view of the apparatus for quality inspection of shafts shown in FIG. 1, showing cutout grooves provided in the rotary table, when the width of the cutout grooves is extended to the maximum width.
Figure 6:
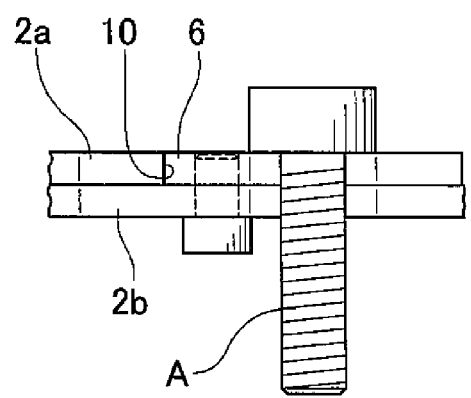
FIG. 6 is a side view of a main section of the apparatus for quality inspection of shafts shown in FIG. 1, illustrating a state in which a shaft as a work is suspended by one of the cutout grooves provided in the rotary table, when the width of the cutout grooves is extended to the maximum width.
Figure 7:
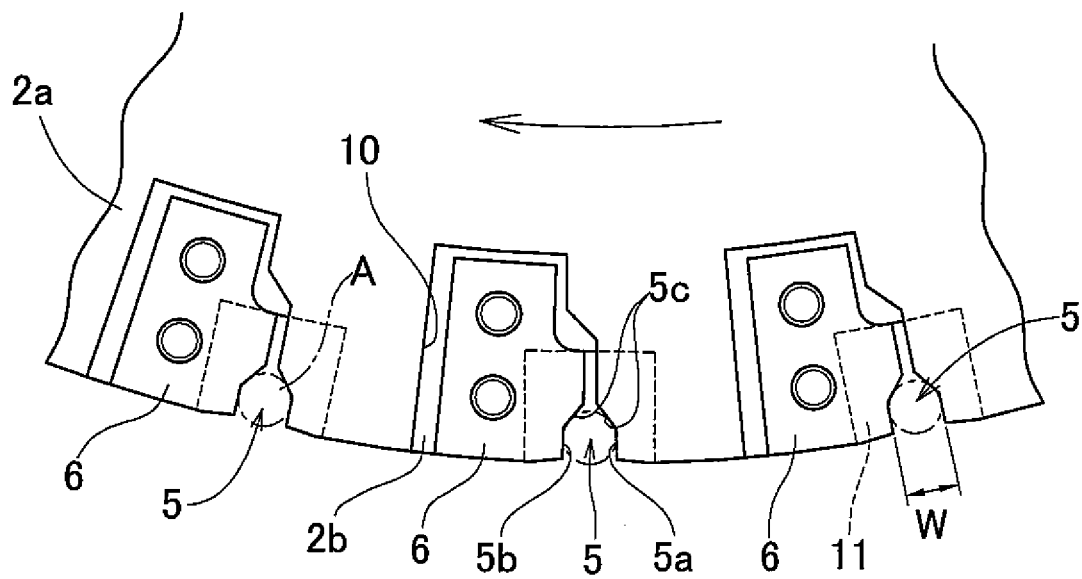
FIG. 7 is a top view of the apparatus for quality inspection of shafts shown in FIG. 1, showing the cutout grooves provided in the rotary table, when the width of the cutout grooves is reduced to the minimum width.
Figure 8:
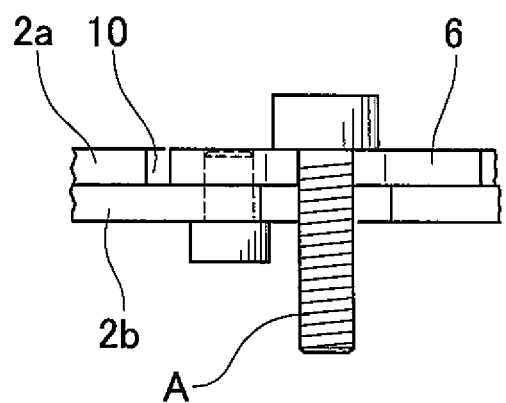
FIG. 8 is a side view of the main section of the apparatus for quality inspection of shafts shown in FIG. 1, illustrating a state in which a shaft as a work is suspended by one of the cutout grooves provided in the rotary table, when the width of the cutout grooves is reduced to the minimum width.
Figure 9A:
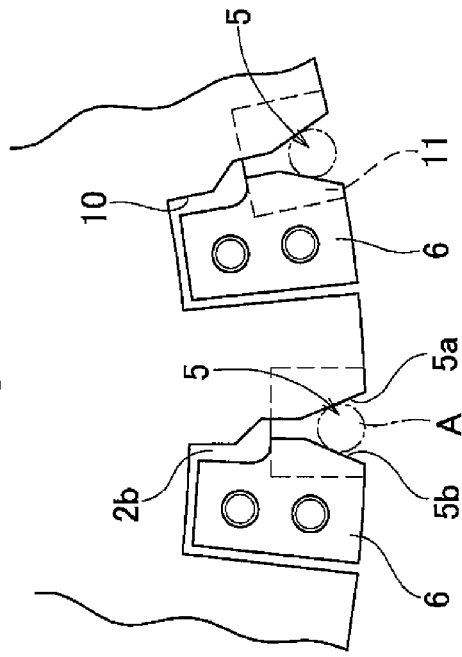
FIG. 9 (*a*) to 9 (*d*) are top views of the main section of the apparatus for quality inspection of shafts shown in FIG. 1, illustrating states in which a pair of groove bottoms of each of the cutout grooves is designed to form an acute angle, and the groove width of the cutout grooves is adjusted to various widths corresponding to shafts varying in shaft diameter.
Figure 9B:
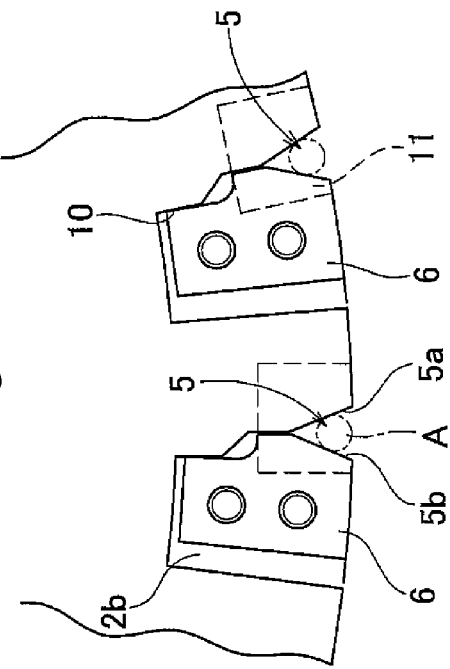
Figure 9C:
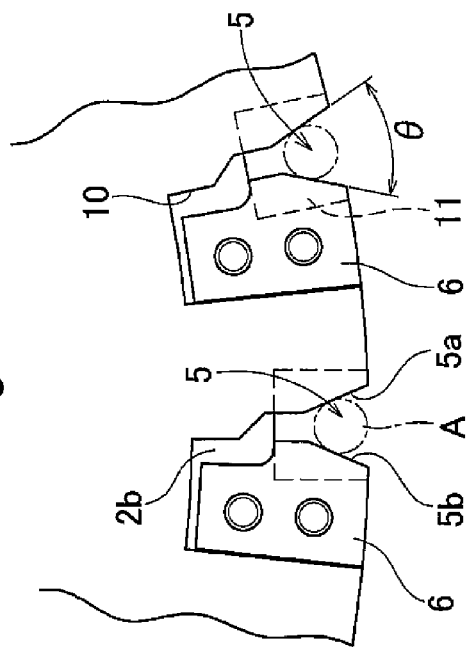
Figure 9D:
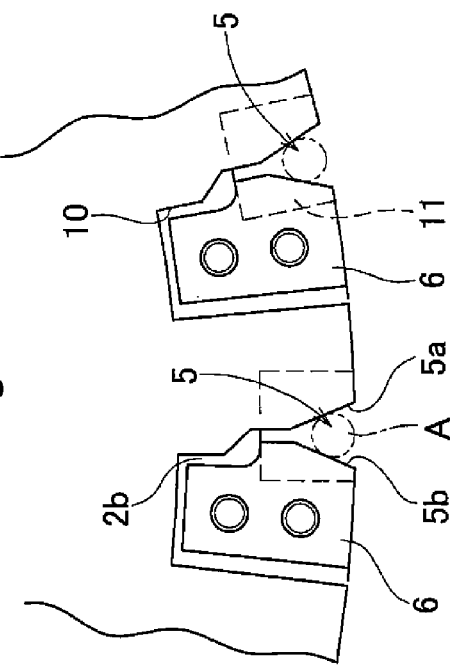

In other words, the groove edges 5a of the cutout grooves 5, i.e. their edges facing forward in the rotational direction of the table are defined by the upper disk 2a, and their groove edges 5b, i.e. the edges facing rearward in the rotational direction of the table are defined by the respective plate members 6 disposed on the lower disk 2b. With this arrangement, it is possible to adjust the groove width W of the cutout grooves 5 by rotating the upper disk 2a and the lower disk 2b relative to each other, as shown in FIG. 5 and FIG. 7.

By adjusting the groove width W, shafts (headed bolts) having shaft diameters varying, for example, from 4 mm to 10 mm can be fed using the same rotary table. In addition, a rotary table corresponding to headed bolts having different shaft diameters within the range of from 3 mm to 6 mm was also prepared for trial, and it has been confirmed that such bolts (shafts) can also be fed without problems.

An embodiment is also possible in which the plate members 6 are arranged to be positioned rearward of the respective cutout grooves 5 in the rotational direction of the table such that the first groove edges 5a of the cutout grooves 5 are defined by the groove edges of the plate members 6 located forward of the respective plate members 6 in the rotational direction of the table; and the second groove edges 5b of the cutout grooves 5 are defined by the side edges of the first cutouts 10 located rearward of the respective first cutouts 10 in the rotational direction of the table. In this embodiment, the same action and effect as those provided by the apparatus shown in the figures can be obtained.

In the figures, the lock mechanism 7 includes circumferentially elongated holes 7a provided in the upper disk 2a; lock screws 7b screwed into the lower disk 2b through the respective circumferentially elongated holes 7a; and a ring shaped presser plate 7c pressed against the upper surface of the upper disk 2a along the inner periphery thereof. The circumferentially elongated holes 7a are provided so that the upper disk 2a and the lower disk 2b are allowed to rotate relative to each other within a specified amount.

The circumferentially elongated holes 7a are arranged on a circle concentric with the center of rotation of the rotary table.

In the lock mechanism 7 shown, when the lock screws 7b are tightened, the presser plate 7c is pressed hard against the upper disk 2a, so that the upper disk 2a and the lower disk 2b are fixed to each other at a desired position within the range permitted for both disks to rotate relative to each other. The lock mechanism 7 is not limited to the one shown in the figures, as long as the upper disk 2a and the lower disk 2b can be fixed at a desired position within the range permitted for both disks to rotate relative to each other.

For example, the lock mechanism 7 may include bolts extending through the upper disk 2a and the lower disk 2b, and nuts screwed to the distal ends of the respective bolts so that the heads of the bolts and the nuts are able to press the upper disk 2a and the lower disk 2b from the opposite directions. In this alternative arrangement, the circumferentially elongated holes 7a, which allow the relative rotation of the both disks, may be formed in the lower disk 2b.

Figure 4:
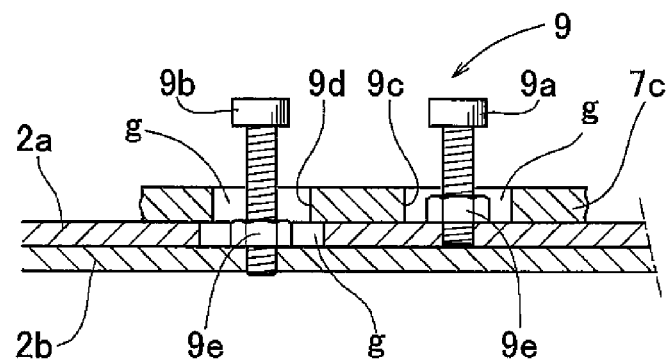
FIG. 4 is a sectional view of the apparatus for quality inspection of shafts shown in FIG. 1, taken along the line IV-IV.

The operating portion 9 is provided in order to allow relative rotation between the upper disk 2a and the lower disk 2b, and includes, as shown in FIG. 4, upright bolts 9a and 9b provided on the upper disk 2a and the lower disk 2b, respectively, such that the upper disk 2a and the lower disk 2 can be rotated relative to each other by holding the bolts 9a and 9b.

In the presser plate 7c, interference avoidance holes 9c are formed so as to provide a play g around each of the bolts 9a and 9b so that the relative rotation between the upper disk 2a and the lower disk 2b is not interfered.

Further, in the upper disk 2a, too, interference avoidance holes 9d are formed so as to provide the play g around each of the bolts 9b so that the relative rotation between the upper disk 2a and the lower disk 2b is not interfered.

The bolt 9a is screwed into the upper disk 2a, and the bolt 9b are screwed into the lower disk 2b, and the operating portion 9 further includes lock nuts 9e to prevent loosening of the respective bolts.

If, as shown in FIG. 1, FIG. 3, FIG. 5, FIG. 7 and FIG. 9, a pair of groove bottoms 5c of each of the cutout grooves 5 is designed to form a V-groove. the position of each shaft A can be stably fixed utilizing the centripetal action provided by the V-groove.

In cases where the groove bottoms 5c of the cutout grooves 5 is designed to form a V-groove, it is preferred that the opening angle θ of each V-groove shown in FIG. 9 be set to an angle compatible with the shaft diameter of the shafts to be conveyed. For example, in cases where the inspection apparatus is intended for inspection of shafts having shaft diameters of greater than 6 mm, the opening angle θ of about 77° was found to be appropriate. In cases where the inspection apparatus is intended for inspection of shafts having shaft diameters of about from 3 mm to 6 mm, it was found out that the pairs of groove bottoms 5c should be sloped steeply such that the opening angle θ would be about 46°.

If each of the cutout grooves 5 is provided with a slit 5d extending radially inward from between the groove bottoms 5c of the cutout groove 5, it is possible to irradiate illumination light to the neck portions of the shafts A held in the cutout groove through the slits 5d, and also to capture the images of the neck portions of the shaft A. However, if the second cutouts 11 having the shape as shown in FIG. 3 are not provided, it is not possible to capture clear images of the neck portions of the shafts A.

The apparatus for quality inspection of shafts also include, in combination with the above mentioned components, various sensors, and other components as disclosed in the above mentioned Patent Document 1, such as: a calculation/determination unit 21 configured to determine the quality of the shafts, by processing the images captured by the CCD camera, and by obtaining the shaft diameters and the like of the photographed shafts based on the changes in areas and the like in the processed images; and a display device 22 configured to display the determined results.

The shafts inspected by the above mentioned inspection apparatus are sorted by a sorting mechanism 16, and non-conforming articles are transferred to a non-conforming article discharging outlet 17, and conforming articles are transferred to a conforming article discharging outlet 18. Well known examples of the sorting mechanism 16 include: one in which air is used to blow the shafts out of the cutout grooves; and one in which a movement restricting-device configured to move away when conforming articles are passing is used to guide non-conforming articles to the non-conforming article discharging outlet 17, and another movement restricting-device is used to guide the conforming articles to the conforming article discharging outlet 18.

Compared with a rotary table made of a single plate and having the same diameter as the rotary table 2, a less number of the cutout grooves can be provided at the outer periphery of the rotary table 2, due to the restriction of space. Therefore, it is preferred that the number of the cutout grooves provided in the rotary table of the inspection apparatus according to the present invention be reduced by a predetermined proportion, relative to the number of the cutout grooves provided in the rotary table of the conventional inspection apparatus, having the same diameter.

For example, if the rotary table of the conventional inspection apparatus has 60 cutout grooves, the number of the cutout grooves provided in the present invention is preferably set to 30, namely, half the number of those in the conventional apparatus. In this case, by replacing the rotary table in the conventional inspection apparatus with the rotary table according to the present invention, and by setting the rotational speed of the rotary table to double the speed used for the conventional rotary table, it is possible to use the conventional inspection apparatus as it is.

EXAMPLES

Figure 13:
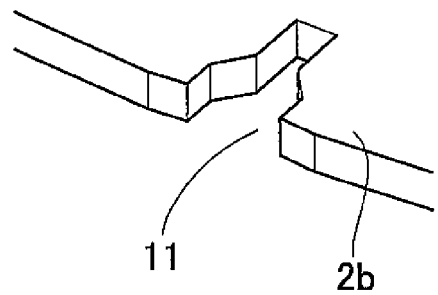
FIG. 13 is a perspective view showing one of second cutout portions provided in the rotary table included in the inspection apparatus used for comparison in Example.

The apparatus for inspection of shafts (the apparatus of the present invention) including the rotary table shown in FIG. 1 to FIG. 8 (the rotary table in which the surfaces of the second cutouts are mirror finished), are compared with an experimentally manufactured apparatus for inspection of shafts (an apparatus for comparison) (having the same specifications as the apparatus according to the present invention, except for the second cutouts 11, cameras and lenses) in which the lower disk of the rotary table is provided with the second cutouts having the shape as one shown in the FIG. 13, that is, the second cutouts 11 in which the width of the radially inner portions thereof is decreased to form slit-like shapes. The performances of both the apparatuses are then compared.

The CCD camera provided in the inspection unit II of the apparatus of the present invention is CV-035M (part number) (300,000-pixel black and white camera), manufactured by KEYENCE CORPORATION, and the lens used is SV-2514V (part number), manufactured by VS Technology Corporation.

The CCD camera provided in the inspection unit II of the apparatus for comparison is CV-035C (part number) (300,000-pixel color camera), manufactured by KEYENCE CORPORATION, and the lens used is SV-F3516-YTF (part number), manufactured by VS Technology Corporation.

The coaxial illumination 19a is IFV-C40DW DC12V (part number), manufactured by IMAC Co., Ltd.; the dome-shaped illumination 19b is IDDA-KH120DW DC12V (part number), manufactured by IMAC Co., Ltd.; the back light 20 is IDHM-32/62HRT DC12V (part number), manufactured by IMAC Co., Ltd.; and the power supply used for the illuminations is IDGA-30M4 (part number), manufactured by IMAC Co., Ltd.

Distance: L1, which is the distance from the inspection point to the installation point of the CCD camera, is 80 mm; distance L2: which is the distance from the inspection point to the position of the lighting equipment 19, is 15 mm; distance L3: which is the distance from the inspection point to the position of the back light 20, is 45 mm; the shutter speed when capturing images is 1/2000 second in the apparatus according to the invention, and 1/5000 second in the apparatus for comparison; and the travelling speed of the shafts (works) is about 400 mm/s (to be precise, they do not travel at a constant speed).

Figure 11:
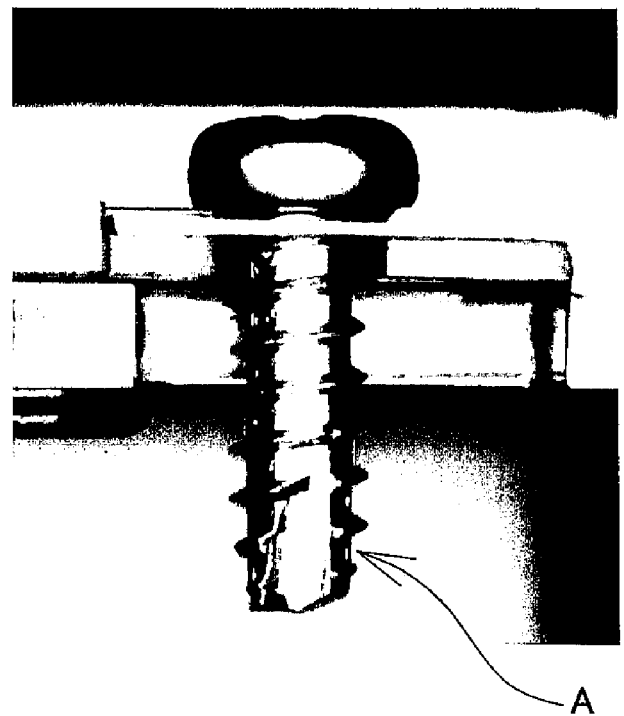
FIG. 11 is an example of images captured by a camera included in the inspection apparatus of Example (apparatus of the invention).
Figure 12:
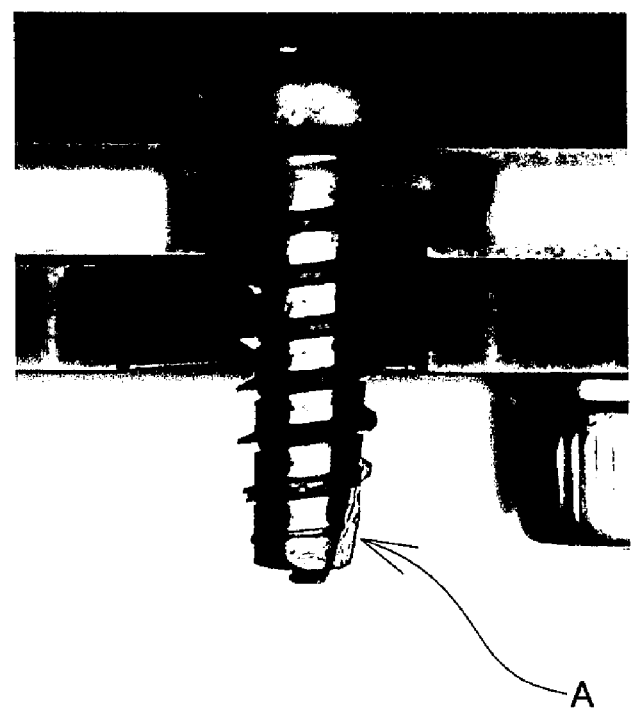
FIG. 12 is an example of images captured by a camera included in an inspection apparatus used for comparison in Example.

The images obtained in this comparison test are shown in FIG. 11 and FIG. 12. FIG. 11 shows an image captured by the apparatus according to the invention, and FIG. 12 shows an image captured by the apparatus for comparison.

As can be seen from these two images, in the image captured by the apparatus for comparison, in which the lower disk 2b of the rotary table 2 is provided with the second cutouts 11 formed in the shape as shown in FIG. 12, the profile of the shaft A below its neck portion is blurred and unclear. In contrast, in the image captured by the apparatus according to the invention, in which the lower disk 2b of the rotary table is provided with the second cutouts 11 formed in the shape as shown in FIG. 3, the profile of the shaft A below its neck portion is clear.

While different cameras, lenses and the shutter speeds when capturing the images are used in the apparatus according to the invention and in the apparatus for comparison, since the profiles of the portions of the shafts A other than the portions below their neck portions in both the images are clear, it is considered that the difference in clarity between the profiles of the portions of the shafts A below the neck portions in both the images, is evidently due to the difference in the shapes of the second cutouts 11.

In any case, the apparatus according to the invention is capable of capturing a clear image of entire region of each of the shafts, and serves to improve the accuracy and reliability of the quality inspection of the shafts.

The invention claimed is:

1. An apparatus for quality inspection of shafts, comprising:
a rotary table provided with cutout grooves disposed at an outer periphery thereof at a predetermined pitch, and configured to receive neck portions of headed shafts supplied from the work feeder in the respective cutout grooves, and to convey the headed shafts while being suspended by the rotary table; and
an inspection station disposed at an intermediate portion of a conveyance path to be formed by the rotation of the rotary table;
wherein the inspection station includes a camera configured to capture images of the headed shafts being conveyed, from radially outward of the rotary table;
wherein the rotary table comprises: an upper disk and a lower disk stacked in a vertical direction so as to be rotatable relative to each other; and plate members provided in the same number as the cutout grooves, each having a same thickness as the upper disk;
wherein first cutouts each defining each of the cutout grooves are provided at an outer periphery of the upper disk, and second cutouts each corresponding to each of the first cutouts are provided at an outer periphery of the lower disk;
wherein each of the plate members is inserted in each of the first cutouts, and fixed to an upper surface of the lower disk;
wherein each of the cutout grooves has a first groove edge and a second groove edge facing, respectively, forward and rearward in a direction in which the table rotates, wherein one of the first and second groove edges is defined by one of side edges of each of the first cutouts, and the other of the first and second groove edges is defined by one of side edges of each of the plate members;
wherein each of the second cutouts is formed as an angular groove including side edges which are parallel to each other and located forward and rearward in the direction in which the table rotates, and an end edge perpendicular to the side edges of each second cutout; and
wherein a distance between the side edges of each second cutout is set to be larger than a maximum groove width of each of the cutout grooves, whose width can be adjusted.

2. The apparatus for quality inspection of shafts according to claim 1, wherein surfaces of the side edges and the end edges, of the second cutouts are mirror finished.

3. The conveyance apparatus for shafts according to claim 1, each of the cutout grooves has groove bottoms designed to form a V-groove.

4. The apparatus for quality inspection of shafts according to claim 1, wherein each of the cutout grooves is provided with a slit extending radially inward from between the groove bottoms of the cutout groove.

5. The apparatus for quality inspection of shafts according to claim 1, further comprising an operating portion for allowing relative rotation between the upper disk and the lower disk in a predetermined manner.

6. The conveyance apparatus for shafts according to claim 2, each of the cutout grooves has groove bottoms designed to form a V-groove.

7. The apparatus for quality inspection of shafts according to claim 2, wherein each of the cutout grooves is provided with a slit extending radially inward from between the groove bottoms of the cutout groove.

8. The apparatus for quality inspection of shafts according to claim 3, wherein each of the cutout grooves is provided with a slit extending radially inward from between the groove bottoms of the cutout groove.

9. The apparatus for quality inspection of shafts according to claim 6, wherein each of the cutout grooves is provided with a slit extending radially inward from between the groove bottoms of the cutout groove.

10. The apparatus for quality inspection of shafts according to claim 2, further comprising an operating portion for allowing relative rotation between the upper disk and the lower disk in a predetermined manner.

11. The apparatus for quality inspection of shafts according to claim 3, further comprising an operating portion for allowing relative rotation between the upper disk and the lower disk in a predetermined manner.

12. The apparatus for quality inspection of shafts according to claim 4, further comprising an operating portion for allowing relative rotation between the upper disk and the lower disk in a predetermined manner.

13. The apparatus for quality inspection of shafts according to claim 6, further comprising an operating portion for allowing relative rotation between the upper disk and the lower disk in a predetermined manner.

14. The apparatus for quality inspection of shafts according to claim 7, further comprising an operating portion for allowing relative rotation between the upper disk and the lower disk in a predetermined manner.

15. The apparatus for quality inspection of shafts according to claim 8, further comprising an operating portion for allowing relative rotation between the upper disk and the lower disk in a predetermined manner.

16. The apparatus for quality inspection of shafts according to claim 9, further comprising an operating portion for allowing relative rotation between the upper disk and the lower disk in a predetermined manner.

\* \* \* \* \*